United States Patent [19]
Ikeda et al.

[11] Patent Number: 6,141,349
[45] Date of Patent: Oct. 31, 2000

[54] NETWORK SYSTEM

[75] Inventors: Toshihisa Ikeda, Kyoto; Kenichi Moriguchi, Neyagawa, both of Japan

[73] Assignee: Matsushita Electric Industrial Co., Ltd., Osaka, Japan

[21] Appl. No.: 09/246,140

[22] Filed: Feb. 8, 1999

[30] Foreign Application Priority Data

Feb. 13, 1998 [JP] Japan .................................. 10-030961
Apr. 23, 1998 [JP] Japan .................................. 10-113459

[51] Int. Cl.[7] ................................................ H04L 12/427
[52] U.S. Cl. ........................ 370/405; 370/403; 370/425
[58] Field of Search .................................. 370/254, 255, 370/256, 257, 354, 356, 386, 400, 401, 403, 404, 405, 406, 407, 453, 425

[56] References Cited

U.S. PATENT DOCUMENTS

| | | | |
|---|---|---|---|
| 4,731,784 | 3/1988 | Keller et al. ........................... | 370/400 |
| 5,060,224 | 10/1991 | Konishi .................................. | 370/404 |
| 5,189,541 | 2/1993 | Konishi .................................. | 370/404 |
| 5,388,099 | 2/1995 | Poole ..................................... | 370/257 |
| 5,500,857 | 3/1996 | Nakata ................................... | 370/440 |
| 5,583,867 | 12/1996 | Poole ..................................... | 370/257 |
| 5,729,548 | 3/1998 | Holender ................................ | 370/474 |

FOREIGN PATENT DOCUMENTS

| | | |
|---|---|---|
| 0 594 200 A2 | 4/1994 | European Pat. Off. . |
| 0 802 655 A2 | 10/1997 | European Pat. Off. . |
| 04346228 | 11/1992 | Japan . |

OTHER PUBLICATIONS

"A Reliable and Parallel Double–Ring FDDI Metropolitan Area Network", by Maria C. Yuang et al., vol. 1, No. Conf. 11, Jan. 1, 1992, pp. 352–362.

"Interconnection of High Speed Token Ring Lans: A Switch– Connection Approach", by Tsong–ming Tsai et al., vol. 3, No. Conf. 9, Jun. 3, 1990, pp. 989–996.

"Local Area Network"written by Takahiko Kamae, published by Shokodo, July 6, 1992.

*Primary Examiner*—Joseph L. Felber
*Attorney, Agent, or Firm*—Wenderoth, Lind & Ponack, L.L.P.

[57] ABSTRACT

A network system in which at least one loop comprising plural loop-connected nodes and at least one loop comprising either a single node or plural loop-connected nodes are directly connected to a common transmission line, wherein a signal output from one of the nodes is transmitted to all the nodes, and then is discarded by one of the nodes in each loop.

6 Claims, 7 Drawing Sheets

| token master node flag | 0 : "other than token master"<br>1 : "token master" |
|---|---|
| loop master flag | 0 : "other than loop master"<br>1 : "loop master" |
| loop address of token master node | loop address number of token master node<br>e.g.) 0x0 |
| node ID | node ID comprising loop address and node address<br>e.g.) 0x00 |

NETWORK SYSTEM

FIELD OF THE INVENTION

The present invention relates to a network system which realizes connection of a bus type network and a loop type network.

BACKGROUND OF THE INVENTION

Figure 10:
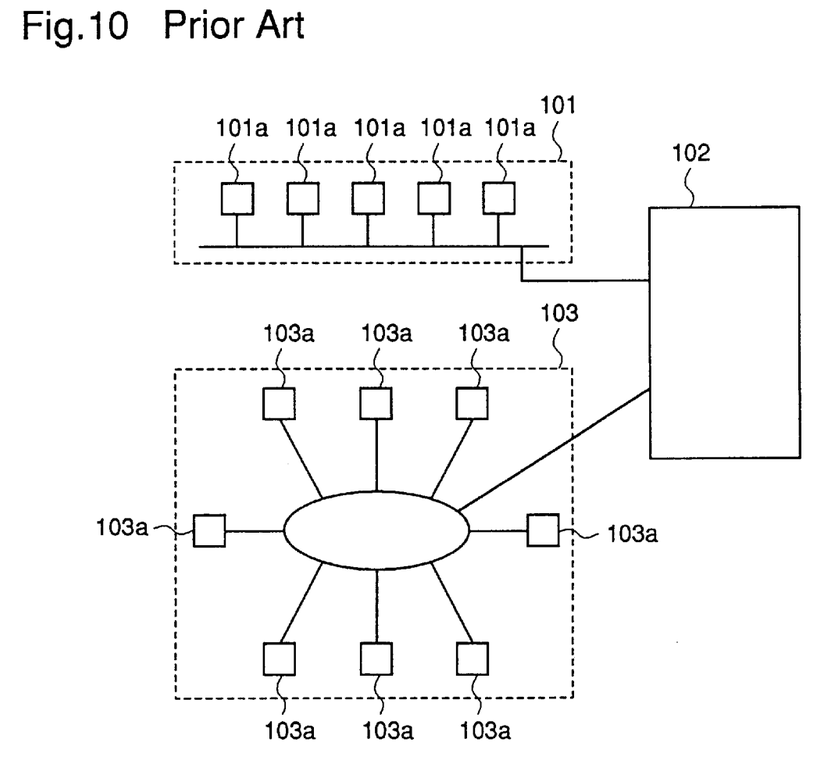
FIG. 10 is a diagram showing an example of connection of a network by the use of a gateway according to a prior art.

In recent years, as digitization of video data or audio data evolves, a network which transmits computer data such as a control command and digital AV data typical of MPEG (Moving Picture Expert Group) together has been put into practical use at home or in cars. The demand for a variety of and flexible network connection forms goes on increasing, including increasing nodes and ordering of reliability for each group of apparatuses or for each data. In the past, for interconnection of networks of different topologies such as the bus type network and the loop type network, a gateway or a router was generally used in a network layer as described in a reference "Local Area Network" written by Naohiko Kamae, published by Shokodo, Jul. 6, 1992. FIG. 10 shows this example. In FIG. 10, reference numeral 101 designates a bus type network, 101a designates nodes connected to the bus type network 101, 102 designates a gateway or a router, 103 designates a loop type network, and 103a designates nodes connected to the loop type network 103. The bus type network 101 and the loop type network 103 are interconnected via the gateway or the router 102.

The loop type network comprises less optical fibers for connecting nodes and less optical modules, and therefore provides cost-effectiveness and high node extensibility. However, since breakage of parts of the optical fibers or failures of nodes causes the network to be in inoperable state and the failures are difficult to diagnose, the loop type network is less reliable and requires much maintenance. On the other hand, although the bus type network comprises more optical fibers or optical modules and thereby is not cost-effective, the breakage of parts of the optical fibers or the failures of the nodes causes the nodes to be in inoperable state but does not affect the whole network, and therefore it is reliable and requires little maintenance. For these reasons, use of a combination of these networks depending upon the use or importance of equipment can make up for drawbacks of respective networks, and thereby achieves a network which provides cost-effectiveness, high reliability, and high extensibility, and requires little maintenance. Since the gateway or the router is used for connecting networks, these apparatuses require packet switching at a high speed, and therefore require a computer system or complicated devices and thus they are not suitable for use at home or in cars from the point of view of the cost-effectiveness and scale.

SUMMARY OF THE INVENTION

It is an object of the present invention to provide a network system in which the bus type network and the loop type network are connected without the use of the gateway or the router.

Other objects and advantages of the invention will become apparent from the detailed description that follows. The detailed description and specific embodiments described are provided only for illustration since various additions and modifications within the spirit and scope of the invention will be apparent to those skill in the art from the detailed description.

According to a first aspect of the present invention, a network system in which at least one loop comprising plural loop-connected nodes and at least one loop comprising either a single node or plural loop-connected nodes are directly connected to a common transmission line, wherein a signal output from one of the nodes is transmitted to all the nodes, and then is discarded by one of the nodes in each loop. Therefore, without the use of computers or complicated control devices, it is possible to realize connection of a loop type network and a bus type network in which a single node and a group of loop-connected nodes are connected to a physically common medium.

According to a second aspect of the present invention, a network system in which at least one loop comprising plural loop-connected nodes and at least one loop comprising either a single node or plural loop-connected nodes are bus-connected by the use of an optical star coupler, the nodes of the loop each has a unique node identifier, one node included in one of plural loops serves as a token master node, and nodes other than the node serving as the token master node serve as slave nodes, wherein the token master node includes: a token transmitting apparatus for transmitting a token packet which contains a transmission node identifier as a node identifier of a node which is allowed to transmit a data packet and a receiving node identifier as a node identifier of a node which is allowed to receive the transmitted data packet; a token analyzing apparatus for analyzing the token packet; a storage for temporarily storing connection information indicating whether an output of the self node is directly connected to the bus or connected to another node included in the corresponding loop, a node identifier of the token master node, and information about the received packet; a data transmitting apparatus for transmitting the data packet; and a switch for discarding or passing the received token packet; the slave nodes each includes: a token analyzing apparatus for analyzing the token packet; a storage for temporarily storing connection information indicating whether an output of the self node is directly connected to the bus or connected to another node included in the corresponding loop, a node identifier of the token master node, and information about the received packet; a data transmitting apparatus for transmitting the data packet; and a switch for discarding or passing the received token packet; and the token analyzing apparatus of each node, when the token packet is transmitted, controls the switch in each node so that the token packet is transmitted to all the nodes and then is discarded on the network, according to the connection information and the node identifier of the token master node which are stored in the storage, and when th e data packet is transmitted, it controls the switch so that the data packet is transmitted to all the nodes and then is discarded on the network, according to the connection information and the information of the received token packet which are stored in the storage. Therefore, without the use of computers or complicated control devices, it is possible to realize connection of a loop type network and a bus type network in which a single node and a group of loop-connected nodes are connected to a physically common medium.

DETAILED DESCRIPTION OF THE PREFERRED EMBODIMENTS

Now, a description will be given of a preferred embodiment of the present invention with reference to FIGS. 1 through 9.

Embodiment 1.

Figure 1:
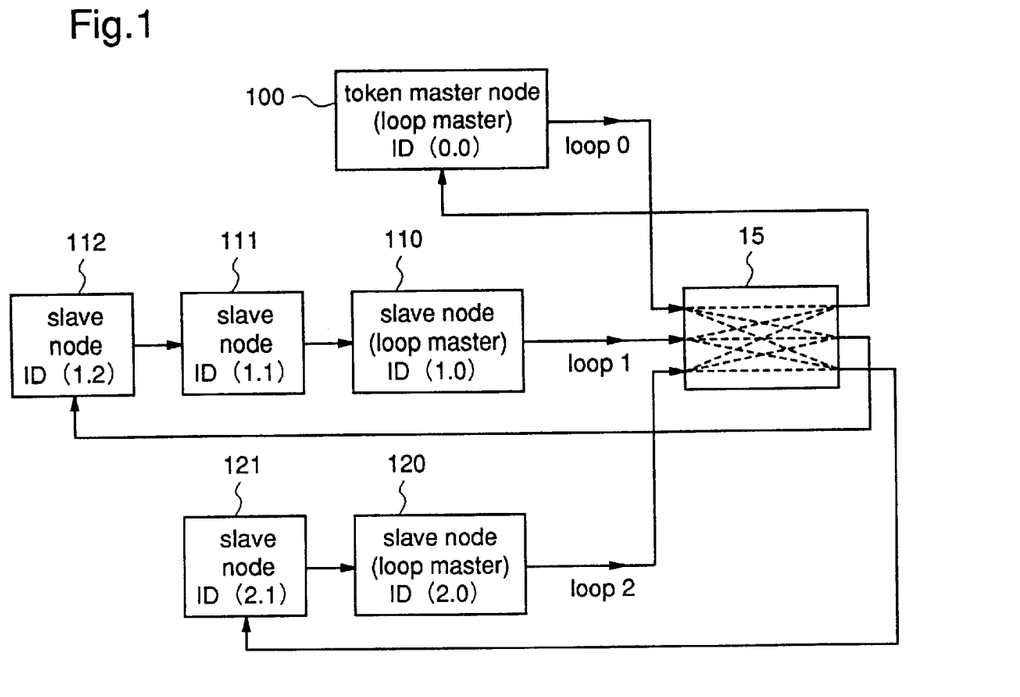
FIG. 1 is a diagram showing an example of construction of a network system according to a first embodiment of the present invention.

FIG. 1 shows an example of construction of a network system according to the first embodiment of the present invention.

In FIG. 1, reference numerals 100, 110, 111, 112, 120, and 121 designate nodes connected to a network, and reference numeral 15 designates an optical star coupler. The node 100 is a token master node and the nodes 110, 111, 112, 120, and 121 are slave nodes. The node 100 is a loop master of a loop 0 comprising the node 100. The node 110 is a loop master of a loop 1 comprising the nodes 110, 111, and 112. The node 120 is a loop master of a loop 2 comprising the nodes 120 and 121. In FIG. 1, arrows show flow of data. As shown in FIG. 1, in the network of the first embodiment, the loops (loop1, loop2) in which plural nodes are connected in one direction or the loop (loop 0) comprising a single loop are connected to the optical star coupler 15, and among the nodes of respective loops, the nodes having outputs connected to the optical star coupler 15 serve as the loop masters.

Figure 2:
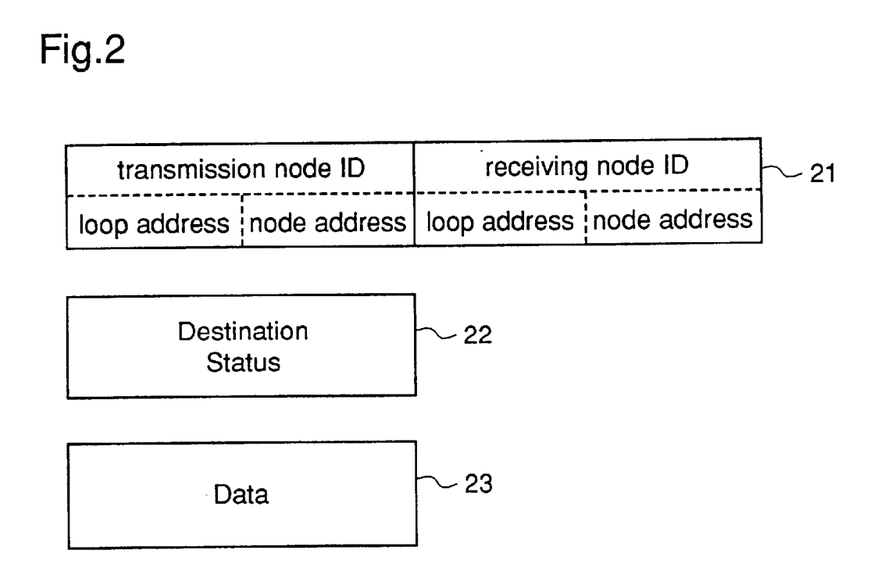
FIG. 2 is a diagram showing a structure of a packet transmitted over a network in the network system according to the first aspect of the present invention.

FIG. 2 shows a structure of a packet transmitted over the network in the network system according to the first embodiment of the present invention. In FIG. 2, reference numerals 21, 22, and 23 designate a token packet, a DS (Destination Status) packet, and a data packet, respectively.

The token packet 21, as shown in FIG. 2, includes a transmission node identifier (ID) and a receiving node identifier (ID). The transmission node ID is a node ID of a node which is allowed to transmit data by the token master node, and the receiving node ID is a node ID of a node which is allowed to receive data by the token master node. The node IDs each comprises a loop address to which the corresponding node belongs and a node address on the loop. The loop address is a number unique to each loop, and the node address is a number unique to each node. To specify a node on the network, specify a loop address of a loop to which the node belongs and a node address of the node on the loop. In this first embodiment, the node ID is described as identifying a loop address and a node address. For instance, the node ID of a node comprising a loop address 1 and a node address 2 is expressed as (1, 2).

A DS packet 22, as shown in FIG. 2, includes a field of "Destination Status". The node indicated by the receiving node ID field of the token packet 21 as the receiving node, transmits the DS packet 22. The DS packet 22 contains information indicating whether or not the receiving node can receive data.

A data packet 23 includes a field of data to be transmitted. The node indicated by the transmission node ID field of the token packet 21 as the transmission node, transmits the data packet 23.

Figure 3:
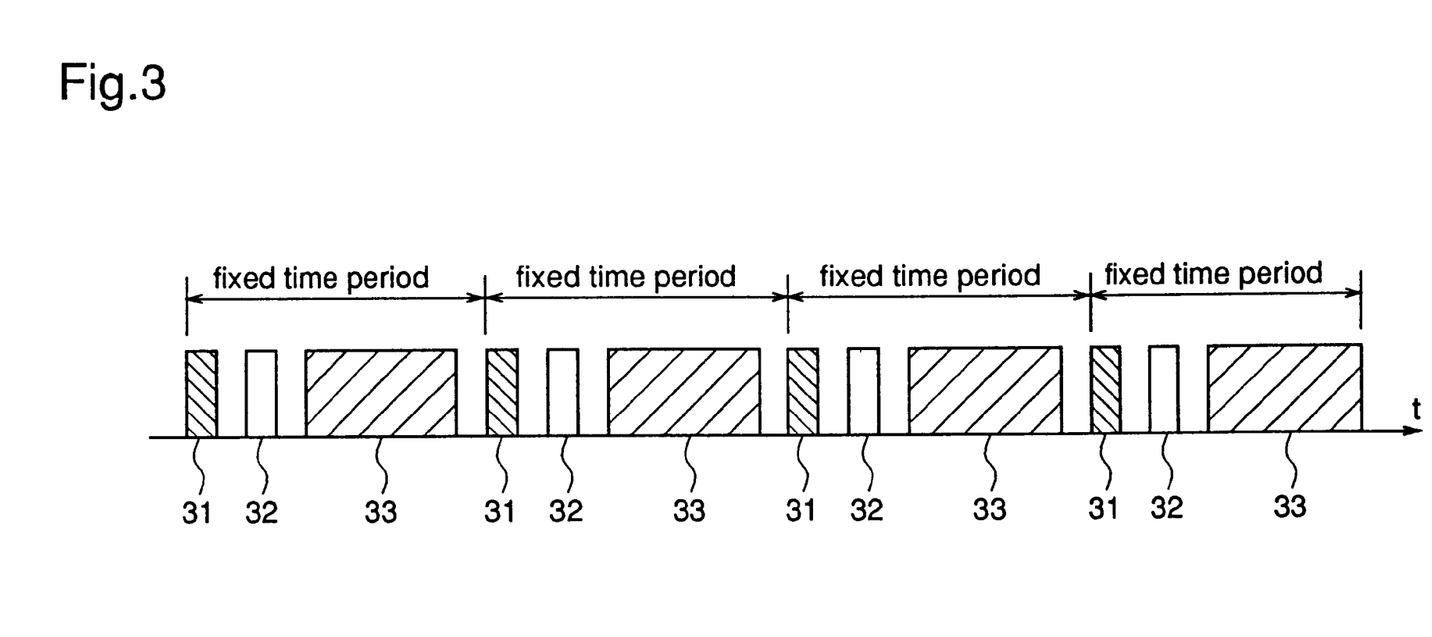
FIG. 3 is a diagram showing a sequence in which packets are transmitted over the network in the network system of the first embodiment.

FIG. 3 shows packets transmitted over the network. In FIG. 3, reference numerals 31, 32, and 33 designate the token packet, the DS packet, and the data packet, respectively. In the network system of this first embodiment, the token packet, the DS packet, and the data packet are transmitted through the network in this order, and this is repeatedly performed at regular time intervals.

Figure 4:
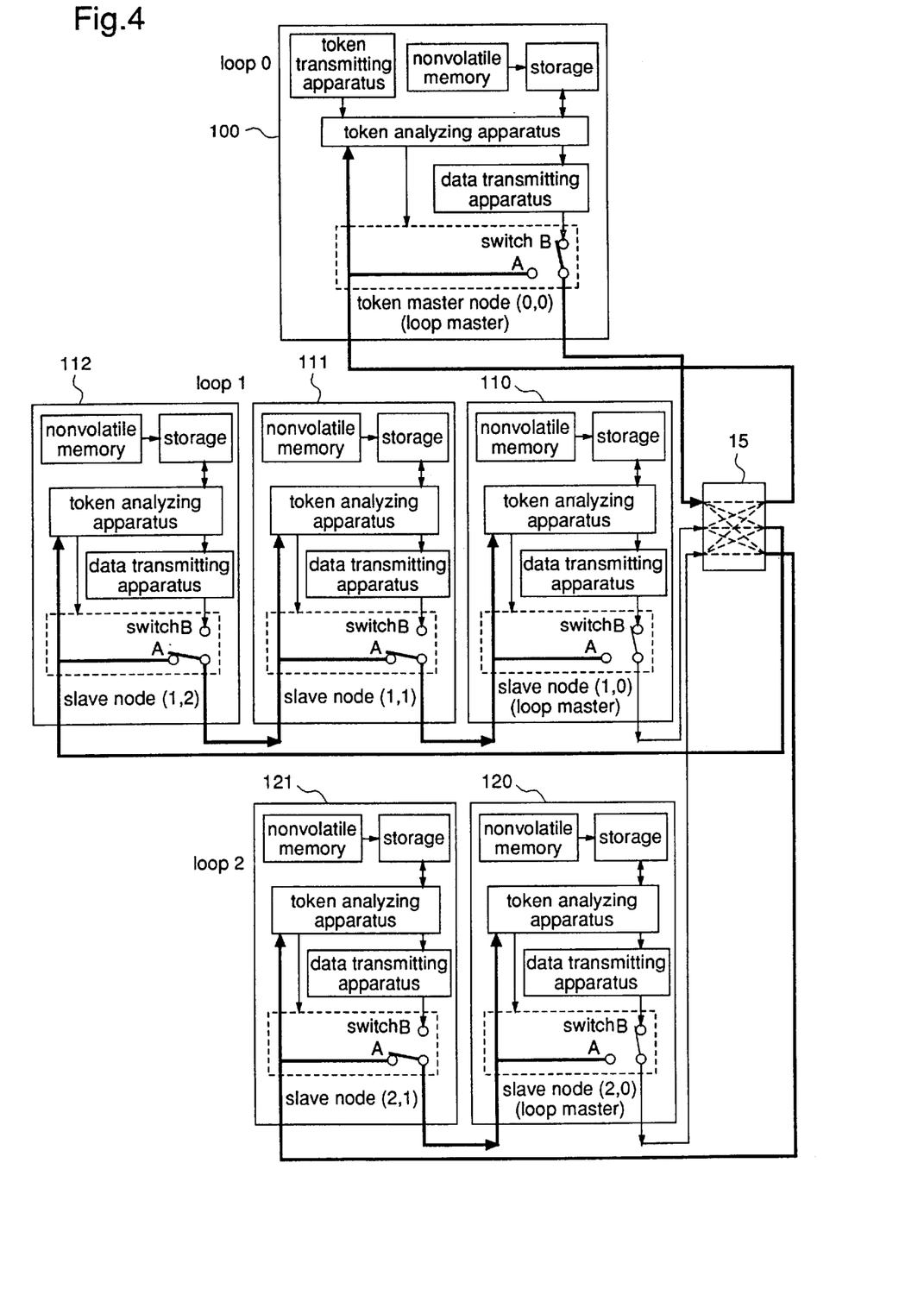
FIG. 4 is a diagram showing states of switches of respective nodes when a token packet is transmitted in a network system of the first embodiment and flow of the token packet.

FIG. 4 shows a detailed construction of the network system of the first embodiment. In FIG. 4, reference numerals 100, 110, 111, 112, 120, and 121 designate nodes connected to the network, and reference numeral 15 designates an optical star coupler. The node 100 is a token master node, and the nodes 110, 111, 112, 120, and 121 are slave nodes. The node 100 belongs to the loop 0, the nodes 110, 111, and 112 belong to the loop 1, and the nodes 120 and 121 belong to the loop 2. The nodes 100, 110, and 120 are loop masters. The node IDs of the node 100, the node 110, the node 111, the node 112, the node 120, and the node 121 are (0. 0), (1. 0), (1. 1), (1. 2), (2. 0) and (2. 1), respectively. That is, each node has a node ID unique to it.

As shown in FIG. 4, the slave nodes 111, 112, and 121 and the loop master nodes 110 and 120, each comprises a token analyzing apparatus which analyzes a token and a packet, a nonvolatile memory which stores initialization information, a storage connected to the token analyzing apparatus and the nonvolatile memory, a data transmitting apparatus for transmitting data, and a switch for connecting or breaking the loop. Placing the switch to A connects the loop and placing the switch to B breaks the loop.

The token master node 100 includes a token transmitting apparatus for transmitting a token in addition to the components of the slave node. Placing the switch to A connects the loop and placing the switch to B breaks the loop.

As for the nonvolatile memory, anything will do so long as it can store initialization information and set the initialization in the storage. For example, the memory may be implemented by a DIP switch and the like.

A description will be given of an operation of the network system of the first embodiment so constructed.

Here it is assumed that the token master node 100 transmits a token packet of a transmission node ID (2, 1) and a receiving node ID (1, 1).

In the network system of the first embodiment, the node which has transmitted packets (all the packets including the token packet) performs switching so as to discard the packets sent back to itself. To be specific, the loop master performs switching, thereby discarding packets transmitted from the node which belongs to another loop and passing packets transmitted from the node which belongs to the corresponding loop.

Initially, a description will be given of an operation sequence. The operation sequence is an initialization sequence and a normal operation sequence.

The initialization sequence is activated when power is applied or resetting is performed. In the initialization sequence, information preset in the nonvolatile memory or the DIP switch and the like is read into the storage. After this setting, the token master node operates as the token master node and the loop masters operates as the loop masters. In addition, the loop masters each knows the loop address ("0") of the loop to which the token master node belongs, and every node including the token master node knows the node ID (loop addresses and node addresses) of itself.

Figure 9:
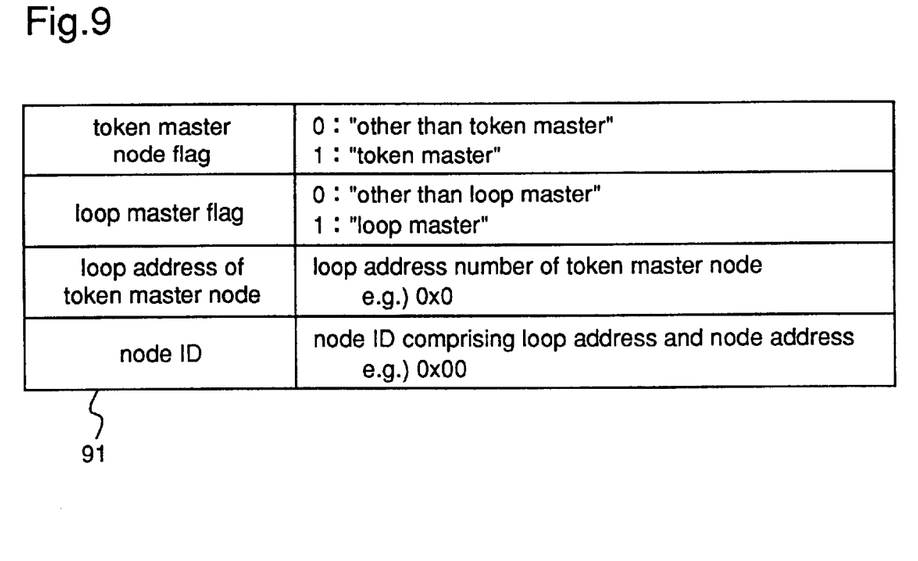
FIG. 9 is a diagram showing an example of information preset in a nonvolatile memory of the first embodiment.

FIG. 9 shows an example of information 91 preset in the volatile memory. Assume that addresses on the nonvolatile memory of each flag, each address, and each node ID are known in this illustrated example. When information 91 is set in the nonvolatile memory as shown in FIG. 9, information stored in the address of the token master node flag on the nonvolatile memory is read, and when it is "0", "other than token master" is set, while it is "1", "token master" is set. The same goes for the loop master flag, the loop address of the token master node, and the node ID.

The normal operation sequence is an operation sequence in which the node transmits and receives packets, and includes a token mode of transmitting the token packet, a DS mode of transmitting the DS packet, and a data mode of transmitting the data packet. Hereinafter, a detailed description will be given of operation in respective modes.

First, the token mode will be discussed with reference to FIG. 4. FIG. 4 shows states of switches of respective nodes when the token packet is transmitted and flow of the token packet. In FIG. 4, bold lines show flow of packets.

In the token master node 100, the token transmitting apparatus constructs the token packet, the data transmitting apparatus restructures the packet to take a form to be transmitted over the network, and then the token analyzing apparatus places the switch to the B position so as to transmit the token packet. Assume that the transmission node ID and the receiving node ID specified by the token packet is (2. 1) and (1. 1), respectively.

The token analyzing apparatus of each of the loop masters 110 and 120 compares the loop address "0" of the token master node 100 stored in the initialization sequence to the address of the corresponding loop ("1"—the loop master 110 "2"—the loop master 120). Since there is no match between them, the token analyzing apparatus decides that the packet has been sent from another loop and then places the switch to position B.

The token analyzing apparatus of each of the slave nodes 111, 112, and 121 places the switch to position A, thereby passing the packet in the token mode.

The token packet transmitted from the token master node 100 is sent through the optical star coupler 15 to the nodes 100, 112, and 121. In the loop 0 of the loop address 0, the token packet transmitted from the optical star coupler 15 is discarded by the token analyzing apparatus of the token master node 100. In the loop 1 of the loop address 1, the token packet is transmitted to the slave node 112, the slave node 111, and the loop master 110 in this order, and is discarded by the token analyzing apparatus of the loop master 110. Likewise, in the loop 2 of the loop address 2, the token packet is transmitted to the slave node 121 and the loop master 120 in this order, and is discarded by the token analyzing apparatus of the loop master 120.

The token analyzing apparatus of each of the nodes stores the transmission ID and the receiving ID contained in the received token packet in the storage.

Thus, the token packet is transmitted in the token mode from the token master node 100 to all the nodes and received by them, and then discarded by the loop master and the token master node.

Figure 5:
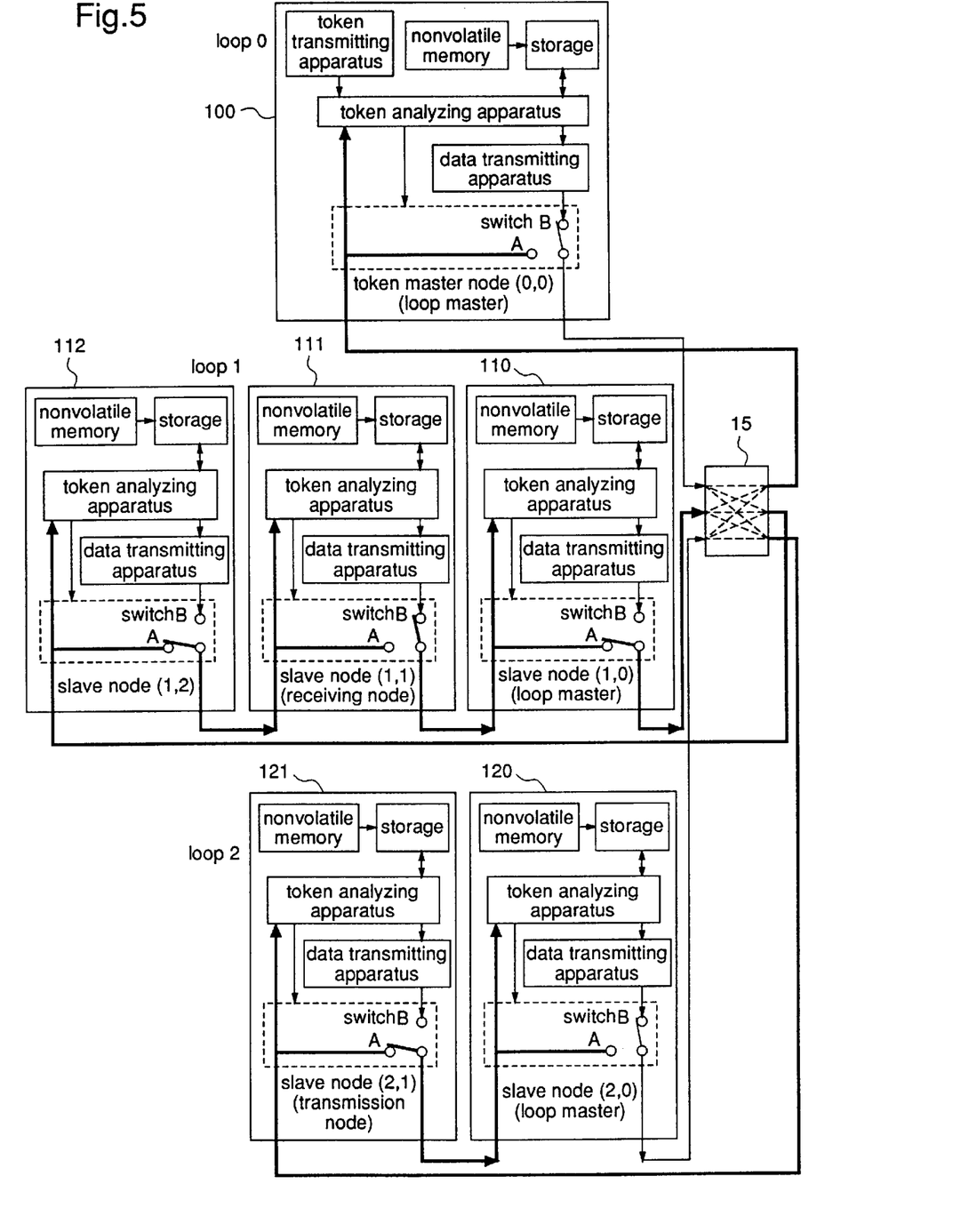
FIG. 5 is a diagram showing states of switches of respective nodes when a DS (Destination Status) packet is transmitted in the network system of the first embodiment and flow of the DS packet.

Next, a description will be given of the DS mode with reference to FIG. 5. FIG. 5 shows states of switches of respective nodes when the DS packet is transmitted, and flow of the DS packet. In the figure, the bold line shows flow of the DS packet.

The token analyzing apparatus of each of the nodes including the token master node and the loop masters, makes a comparison between the receiving node ID stored in the storage resulting from operation in the token mode and the node ID of the corresponding node, and when there is a match between them (the node 111 in this case), and the corresponding node is in the state where it can receive data, it constructs a DS packet indicating "data receivable". On the other hand, when the corresponding node is in the state where it can not receive data, the token analyzing apparatus constructs the DS packet indicating "data unreceivable" and the data transmitting apparatus restructures the DS packet to take a form to be transmitted over the network, followed by placing a switch to position B so as to transmit the DS packet.

The token analyzing apparatus of the loop master 110, since there is no match between the receiving node ID stored in the storage and the node ID of the corresponding node, decides that the node will not output the DS packet. Then, the token analyzing apparatus compares the loop address "1" of the receiving ID stored in the storage and the address "1" of the corresponding loop, and since there is a match between them, it decides that the node in the loop will output the DS packet, and then places the switch to position A.

The token analyzing apparatus of each of the loop masters 100 and 120, since there is no match between the receiving node ID stored in the storage and the node ID of the corresponding node, decides that the node will not output the DS packet. Then, the token analyzing apparatus compares the loop address "1" of the receiving node ID to the address of the corresponding loop ("0"—the node 100, "2"—the node 120), and since there is no match between them, it decides that the Ds packet will be transmitted from the node in another loop, and then places the switch to position B.

The token analyzing apparatus of each of the slave nodes 112 and 121, since there is no match between the receiving node ID stored in the storage and the node ID of the corresponding node, it places the switch to position A.

The DS packet transmitted from the node 111 passes through the node 110, and the optical star coupler 15, to the nodes 100, 112, and 121. In the loop 0, the DS packet transmitted from the optical star coupler 15 is discarded by the token master node 100. In the loop 1, the DS packet is transmitted to the slave node 112 and the slave node 111 in this order, and is discarded by the node 110. In the loop 2, the DS packet is transmitted to the slave node 121 and the loop master 120 in this order, and is discarded by the loop master 120.

The token analyzing apparatus of each of all the nodes including the token master node, makes comparison between the transmission node ID stored in the storage resulting from operation in the token master node and the node ID of the corresponding node, and when there is a match between them (the node 121 in this case), receives the transmitted DS packet and stores its content in the storage.

The DS packet is thus transmitted from the node 111 specified as the receiving node by the token packet to all the nodes, received by the node 121 specified as the transmission node by the token packet, and then discarded by the loop masters 100 and 120 and the node 111 which has transmitted the DS packet.

Figure 6:
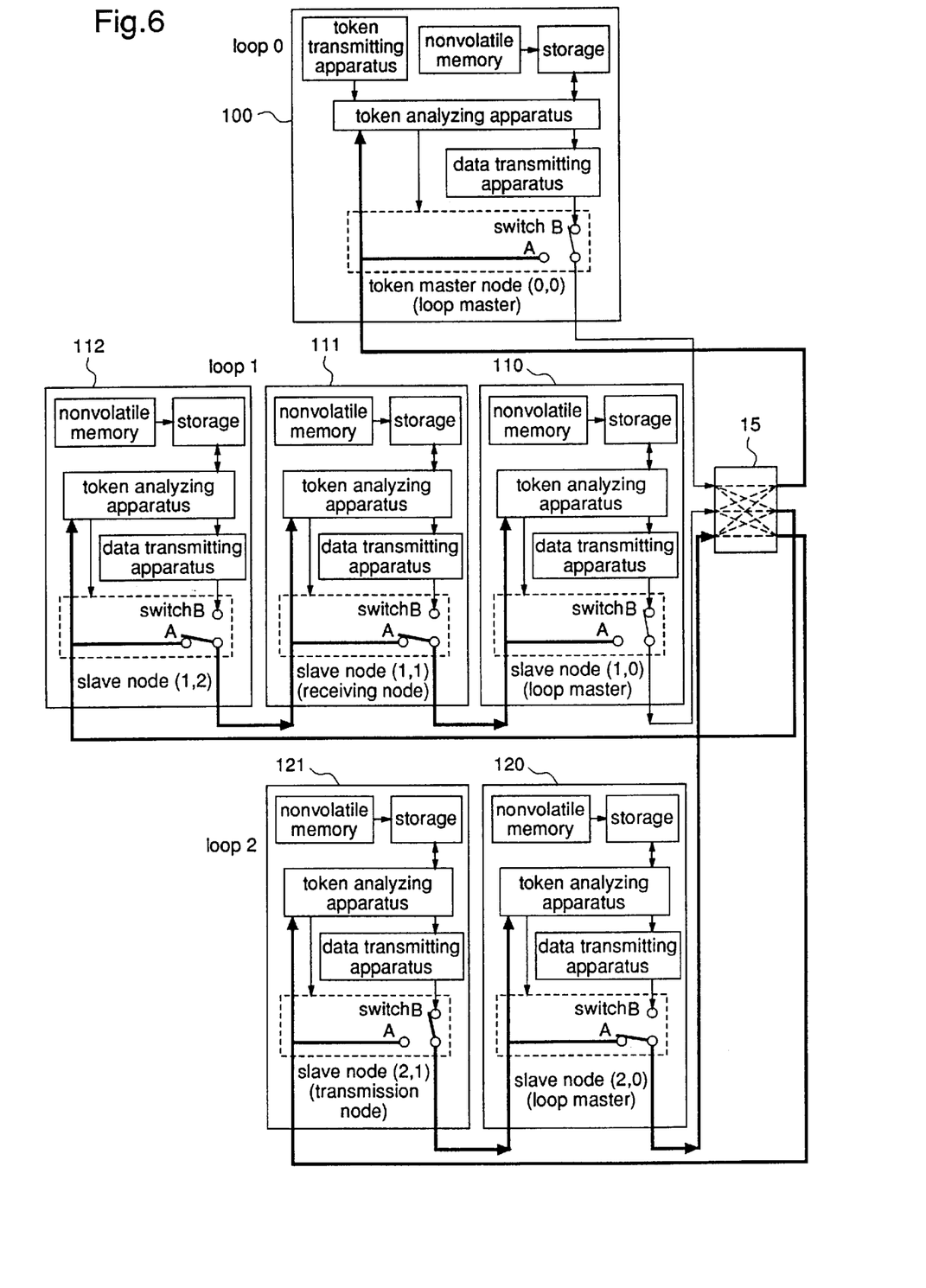
FIG. 6 is a diagram showing states of switches of respective nodes when a data packet is transmitted in the network system according to the first embodiment of the present invention and flow of the data packet.

Finally, a description will be given of the data mode with reference to FIG. 6. FIG. 6 shows states of switches of respective nodes when the data packet is transmitted and flow of the data packet. In the figure, bold lines show flow of the data packet.

The token analyzing apparatus of each of the nodes including the token master node and the loop master, makes comparison between the transmission node ID stored in the storage resulting from operation in the token mode and the node ID of the corresponding node, and when there is a match between them (the node 121 in this case), and the content of the DS packet stored in the DS mode indicates "data receivable", it constructs a data packet, the data transmitting apparatus restructures data to take a form to be transmitted over the network, and the token analyzing apparatus places the switch to position B, thereby transmitting the data packet. On the other hand, the token analyzing apparatus will not transmit the data packet, if there is a match between the transmission node ID stored in the storage and the node ID of the corresponding node but the content of the DS packet stored in the DS mode indicates "data unreceivable".

The token analyzing apparatus of the loop master 120, since there is no match between the transmission node ID stored in the storage and the node ID of the corresponding node, decides that the node will not output the data packet. Then, the token analyzing apparatus makes a comparison between the loop address "2" of the transmission node ID and the loop address "2" of the corresponding loop, and since there is a match between them, it decides that the node in the corresponding loop will transmit the data packet and then places the switch to position A.

The token analyzing apparatus of each of the loop masters 100 and 110, since there is no match between the transmission node ID stored in the storage and the node ID of the corresponding node, decides that the node will not transmit the data packet. Then, the token analyzing apparatus makes a comparison between the loop address "2" of the transmission node ID stored in the storage and the loop address ("0"—100, "1"—110) of the corresponding loop, and since there is no match between them, it decides that the node in another loop will transmit the data packet, and then places the switch to position B.

The token analyzing apparatus of each of the slave nodes 112 and 111, since there is no match between the transmission ID stored in the storage and the node ID of the corresponding node, places the switch to position A so as to pass the packet.

The data packet transmitted from the node 121 passes through the node 120 and the optical star coupler 15 to the nodes 100, 112, and 121. In the loop 0, the data packet transmitted from the optical star coupler 15 is discarded by the token analyzing apparatus of the token master node 100. In the loop 1, the data packet is transmitted to the slave node 112, the slave node 111, and the loop master 110 in this order, and is discarded by the token analyzing apparatus of the loop master 110.

In the loop 2, the data packet transmitted from the optical star coupler 15 is discarded by the slave node 121 which has transmitted the data packet.

The token analyzing apparatus of each of all the nodes including the token master node makes a comparison between the receiving node ID stored in the storage and the node ID of the corresponding node, and when there is a match between them, it receives the transmitted data packet.

The data packet is thus transmitted from the node 121 specified as the transmission node by the token packet to all the nodes, received by the node 111 specified as the receiving node by the token packet, and discarded by the loop masters 100 and 110 and the node 121 which has transmitted the data packet.

When a specified time elapses after the token master node has transmitted the token packet, the token mode is reentered, and data transmission is repeated in the same sequence: the token mode, the DS mode, a the data mode.

As should be appreciated from the forgoing description, the node which has transmitted the packet (the token packet, the DS packet, and the data packet), performs switching so that the packet sent back to itself will be discarded, and the loop masters perform switching so that the packet sent from the node belonging to another loop will be discarded, whereby the packets are transmitted or discarded.

Thus, in accordance with the network system of the first embodiment, physical or electrical switches are provided with which nodes are directly interconnected in a data link layer (Media Access Control: MAC), which are placed to the appropriate positions so that the packet received by the node other than the transmission node is directly transmitted to the upper nodes or discarded by itself, according to the decision on the loop address of the loop to which the transmission node belongs, thereby transmitting or discarding the packet. Therefore, it is possible to construct the network system where the loops and buses coexist in which a plurality of single nodes or a plurality of groups of nodes which are loop-connected are connected to the optical star coupler.

While in the network system of the first embodiment, the means for performing switching so that the packet received by each node is transmitted to its upper node or discarded by itself is implemented by a physical switch which shortens or breaks input and output terminals of the nodes, anything will do so long as it can perform such switching.

The construction of the network system is not limited to that shown in the first embodiment. It is possible to arbitrary set the number of the loops, the number of nodes in the loops, and the number of the nodes directly connected to the optical star coupler, within bit widths of the node IDs or physically limited ranges.

While in the first embodiment, the token master node is directly connected to the optical star coupler, it is possible to dispose the token master node in an arbitrary position of the loop.

In the network system of the first embodiment, the token packet, the DS packet, and the data packet are transmitted in this order, while in a network system where the data is discarded on the transmission line and retransmission of the data is requested and allowed to and by a transmission source, or after the corresponding receiving node has overwritten data, and retransmission of the lost data group is requested and allowed to and by the transmission source, if the receiving node cannot receive data, the phase of transmitting the DS packet may be omitted.

While in the network system of the first embodiment, provided is one node (node 100)on the network system which includes the token transmitting apparatus and serves as the token master node, plural candidate nodes which might serve as the token master node may be provided on the network system. It should be remembered that one of the plural candidate nodes is set to serve as the token master node by information preset in the nonvolatile memory or the DIP switch and the like.

Figure 7:
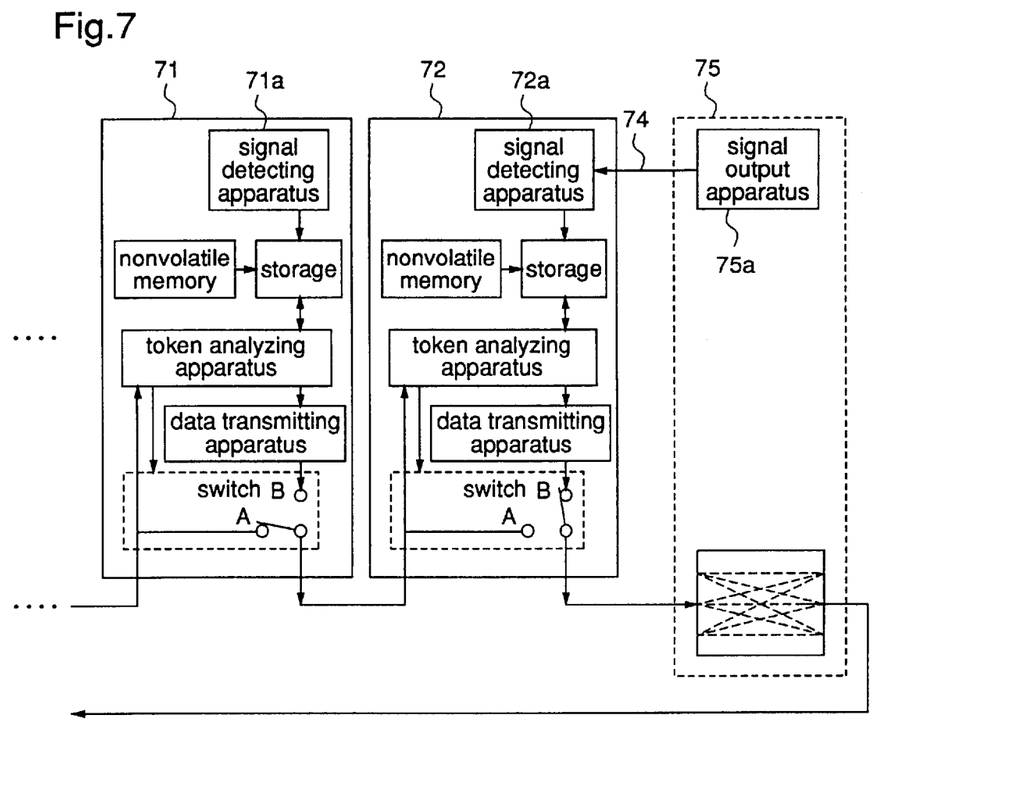
FIG. 7 is a diagram showing construction of automatic recognition of a loop master by a signal line from an optical star coupler.

Instead of reading initialization information preset in the DIP switch or the nonvolatile memory into the storage in the initialization sequence, the following construction is possible. Referring to FIG. 7, reference numerals 71 and 72 designate nodes, respectively. A bus 75 comprising an optical star coupler and a signal output apparatus 75a is provided with a signal line 74 for outputting signals to the node 72 connected to the signal output apparatus 75a and the optical star coupler, the nodes 71 and 72 on the loop type network include signal detecting apparatuses 71a and 72a for detecting signals on the signal line 74, respectively, and the signal output apparatus 75a sends a signal indicating direct connection to the optical star coupler, which the signal detecting apparatus 72a of the node 72 directly connected to the optical star coupler detects and performs setting in the storage so that the node 72 operates as the loop master. Thereby, the node 72 directly connected to the optical star coupler automatically recognizes that it will serve as the loop master.

Figure 8:
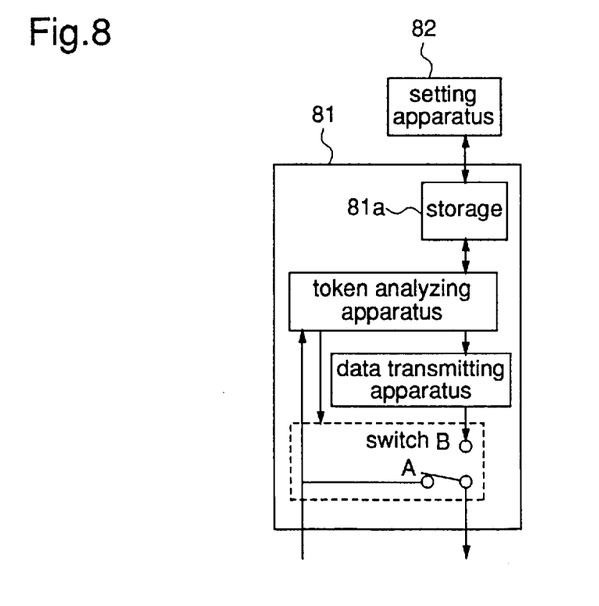
FIG. 8 is a diagram showing initialization by a setting apparatus.

In addition, the following alternative is also possible. As shown in FIG. 8, a node 81 may be connected to a setting apparatus 82, which performs setting in a storage 81a. In this case, the setting apparatus 82 may be implemented by a computer and the like, and the node 81 may be connected to the setting apparatus 82 by serial communication.

Furthermore, application of the system for providing the loop addresses unique to the loops to which the nodes belong and transmitting or discarding data by the use of the loop masters according to the present invention, is not limited to the network system by the use of the token described above. For instance, this may be applied to a network system which employs a CSMA (Carrier Sense Multiple Access) system, a TDMA (Time-Division Multiple Access) system, or an arbitration system using a bus arbiter. In such cases, there is provided loop addresses unique to loops to which the nodes belong, transmission source loop addresses are added to transmission data, the loop master analyzes the loop addresses to transmit or discard data, and the transmission node discards the data sent back to itself, thereby realizing connection of the bus and the loop by the use of the optical star coupler, as in the case of the above embodiment.

What is claimed is:

1. A network system comprising: at least one first loop comprising plural loop-connected nodes and at least one second loop comprising either a single node or a plural loop-connected nodes, wherein said at least one first loop and said at least one second loop are directly connected to a common transmission line, and wherein a signal output from one of the nodes is transmitted to all the nodes, and then is discarded by one of the nodes in each of said at least one first loop and said at least one second loop.

2. A network system of claim 1, wherein an optical star coupler is employed for said common transmission line.

3. A network system comprising: at least one first loop comprising plural loop-connected nodes and at least one second loop comprising either a single node or plural loop-connected nodes, wherein said at least one first loop and said at least one second loop are directly connected to an optical star coupler, the nodes of said at least one first loop and said at least one second loop each have a unique node identifier, one node included in one of said at least one first loop and said at least one second loop serves as a token master node, and nodes other than the node serving as the token master node serve as slave nodes, wherein said token master node includes a token transmitting apparatus operable to transmit a token packet which contains a transmission node identifier as a node identifier of a node which is allowed to transmit a data packet and a receiving node identifier as a node identifier of a node which is allowed to receive the transmitted data packet; a token analyzing apparatus operable to analyze the token packet; a storage operable to temporarily store connection information indicating whether an output of that node is directly connected to said star coupler or connected to another node included in the corresponding loop, a node identifier of the token master node, and information about the received packet; a data transmitting apparatus operable to transmit the data packet; and a switch operable to discard or pass the received token packet;

said slave nodes each include a token analyzing apparatus operable to analyze the token packet; a storage operable to temporarily store connection information indicating whether an output of that node is directly connected to said star coupler or connected to another node included in the corresponding loop, a node identifier of the token master node, and information about the received packet; a data transmitting apparatus operable to transmit the data packet; and a switch operable to discard or pass the received token packet; and said token analyzing apparatus of each node, when the token packet is transmitted, is operable to control said switch in each node so that the token packet is transmitted to all the nodes and then is discarded from the network according to the connection information and the node identifier of said token master node which are stored in said storage, and when the data packet is transmitted, it controls said switch so that the data packet is transmitted to all the nodes and then is discarded from the network according to the connection information and the information of the received token packet which are stored in said storage.

4. The network system of claim 3, wherein:

the nodes further include either a dip switch or a nonvolatile memory, and set the unique node identifier, the node identifier of said token master node, and the connection information in said storage by the use of either said dip switch or said nonvolatile memory when constructing said network system.

5. The network system of claim 3, wherein:

the nodes further include a communication port, and set the unique node identifier, the node identifier of said token master node, and the connection information in said storage by the use of a computer connected to the node when constructing said network system.

6. The network of claim 3, wherein:

a bus device comprising said optical star coupler and a signal output apparatus for outputting a signal is provided; and the nodes further include a signal detecting apparatus for detecting the signal output from said signal output apparatus to decide whether or not the output of the node is directly connected to said bus device from the detected signal.

* * * * *